United States Patent Office 3,239,576
Patented Mar. 8, 1966

3,239,576
CONVERSION PROCESS
Walter G. Appleby, Stamford, Conn., Warren V. Bush, Walnut Creek, Calif., and George Holzman, Godfrey, Ill., assignors to Shell Oil Company, New York, N.Y., a corporation of Delaware
No Drawing. Filed Apr. 10, 1963, Ser. No. 271,875
4 Claims. (Cl. 260—683.15)

This invention relates to a process for the production of supersonic jet fuel components from hydrocarbon mixtures containing $C_5$ olefins.

Supersonic (Mach 2–4) jet aircraft, principally for military purposes but certainly also for limited commercial use, will probably be produced in quantity between 1965 and 1975. These planes may consume over 100,000 gallons of fuel each in an eight-hour day compared with about 18,000 gallons needed by today's long range jets. And the present jet fuels will not work in the supersonic jet aircraft. They are not suited to high temperatures and other operating conditions that accompany supersonic flight. Better thermal stability, greater density, lower volatility and viscosity, high purity and a high Luminometer number (low luminosity), and other changes are required. Moreover, fuel cost will be all-important to the supersonic transport jet. Some 60% more fuel will be needed to fly the same ton-miles covered by today's subsonic transport, so fuel costs will account for a higher proportion of direct operating expense, e.g., fuel would be about 50% of the direct operating costs as compared to 30% for the subsonic jet.

Most fuels now under consideration have serious deficiencies in one or more of the areas listed above. Those fuels which are now cheap enough are so impure (presence of sulfur compounds and metals greatly accelerates fuel decomposition at high temperatures), so volatile (requires pressure tanks or thermally insulated tanks), and so light as to be unsuitable for supersonic jets. Other fuels which could be considered economically attractive (and most of the other fuels) usually have unsatisfactory Luminometer numbers.

The Luminometer number (LN) of a fuel is an empirical measure of the luminosity of a flame, produced by burning the fuel in a specially prescribed manner. (A detailed description of the Luminometer is available in "Tentative Procedure for Operation of Luminometer," March 10, 1959, Erdco Engineering Corporation.) The luminosity is indicative of the proportion of the theoretical chemical energy which is converted to light rather than heat when the fuel is burned. A high Luminometer number (low luminosity) is important for several reasons such as: (1) chemical energy which is converted into light does not help to expand the product gases. Thus, theoretically available chemical energy is, in a luminous combustion, only partially converted into energy of thrust of the aircraft; (2) luminosity is generally due to glowing particles of carbon which would have to be burnt to $CO_2$ in order to realize maximum available heat energy of the fuel. The fact that some of the fuel is incompletely burnt means that neither the potentially available heat nor gas volume is realized; and (3) erosion of the turbine blades can result from the pressure of small, solid particles in a high-velocity gas stream.

We have found a process for the production of particularly good supersonic jet fuel components having improved luminosity characteristics. According to the present invention, a mixture of amylenes is polymerized under controlled conditions so as to minimize the formation of cyclic hydrocarbons having low Luminometer numbers, and the polymerization product is subsequently hydrogenated to produce a supersonic jet fuel component having improved luminosity characteristics. Other advantages of the invention will be apparent from the following detailed description of the invention.

The invention is broadly applicable to a hydrocarbon mixture containing olefins having 5 carbon atoms. It is particularly applicable to a hydrocarbon mixture containing olefins having 5 carbon atoms obtained from the catalytic cracking of hydrocarbon oils. A preferred hydrocarbon mixture is prepared by catalytically cracking hydrocarbon oil and adjusting the cracking conditions to favor the production of $C_5$ olefin, particularly $C_5$ iso-olefin. A hydrocarbon mixture containing the $C_5$ olefin is isolated from the catalytically cracked product. (A typical example of a suitable $C_5$ hydrocarbon mixture obtained from the catalytic cracking of hydrocarbon oil is 44% v. iso-olefin, 25% v. normal olefin, 18% v. iso-paraffin, 9% v. paraffin, and 4% v. cyclo-olefin and cyclo paraffin.)

Normal olefins tend to form more cyclic compounds during the polymerization reaction than do the iso-olefins. And the cyclic compounds have lower Luminometer numbers than isoparaffins. (It is also extremely difficult to separate the cyclic compounds such as naphthenes from isoparaffins.) While the polymerization of a hydrocarbon mixture which contains, as the olefinic constituents, only normal olefin produces a good supersonic jet fuel component, we have found that it is desirable to have even a minor amount of iso-olefin present during polymerization to lessen the formation of cyclic compounds, e.g., suitable hydrocarbon mixture can contain from about 5% w. to 100% w. iso-olefin, basis total olefin content preferably from about 10% w. to 100% w. iso-olefin.

While other types of polymerization catalyst such as silica-alumina, aluminum chloride, boron trifluoride, activated bauxite, etc., can be used, it is preferred to use a phosphorus-containing catalyst such as a catalyst consisting of kieselguhr impregnated with phosphoric acid, a catalyst consisting of phosphoric acid on quartz chips, a catalyst consisting of copper pyrophosphate, etc., to produce a superior jet fuel component. While the discussion (below) regarding effects of operating variables is made with reference to a catalyst consisting of kieselguhr impregnated with phosphoric acid, these effects are generally applicable to the other catalyst systems.

A phosphoric acid polymerization catalyst should possess the correct degree of hydration in order to realize optimum selectivity to olefin trimers and to have a mechanically strong catalyst. Also, as the amount of cyclization has now been found to increase as the catalyst becomes dehydrated, it is particularly important to maintain the optimum water content of the catalyst by adjusting the water content of the hydrocarbon feed to an amount sufficient to give a water partial pressure in the feed (at reaction temperature) of about from one-half to about two-thirds of the equilibrium value of the partial pressure of water over the optimum catalyst (also measured at the reaction temperature). Generally, the use of from about 2 to about 10 percent steam or water in the hydrocarbon feed will maintain the desired water content of the catalyst.

Some of the contaminants which can hamper catalyst activity and which should be avoided in the hydrocarbon feed are oxygen, nitrogen, and caustic. The presence of oxygen, e.g., as little as 0.002 mole percent oxygen in feed, can cause deposition of a resinous material on the catalyst and rapid loss of activity. The presence of more than about 0.5% w. nitrogen (expressed as ammonia) reduces catalyst activity by accumulating in the phosphoric acid catalyst. Washing the olefin feed with water removes most undesirable nitrogen compounds. Caustic neutralizes the catalyst and causes softening and eventual collapse of the pellets.

The polymerization reaction can be carried out at a temperature in the range of from about 145° C. to about 210° C. As the amount of cyclic compounds produced increases as the temperature increases, it is preferred to operate at a low temperature to obtain a better quality product at temperatures above about 210° C., the Luminometer number of the finished product is unsatisfactory because too large an amount of cyclic compounds is present. For example, a hydrocarbon mixture consisting of 2-methyl-2-butene, 2-pentene and n-pentane in the weight ratio of 1:4:5 was passed through a polymerization zone containing a solid catalyst consisting of pelleted kieselguhr (3/16-inch cylindrical pellets) impregnated with phosphoric acid (total phosphoric acid was about 61% w.; free $P_2O_5$ was from about 15 to about 18% w.) at about 695 p.s.i.g., an olefin weight hourly space velocity of about 0.25 and at temperatures of about 150° C. and about 205° C. The polymerization zone effluent was distilled to give a product rich in amylene trimer. The effect of temperature on the quality of this product is shown in Table I.

TABLE I.—EFFECT OF POLYMERIZATION TEMPERATURE ON PRODUCT QUALITY

| Temperature, ° C.: | Refractive index ($n_D^{20}$) |
|---|---|
| 150 | 1.4452 |
| 205 | 1.4492 |

An increase in refractive index indicates an increase in the amount of cyclic compounds contained in the product; hence, polymerization at the lower reaction temperature results in the formation of fewer cyclic compounds and a product which when hydrogenated will have a higher Luminometer number than the hydrogenated product from the higher reaction temperature. However, conversion declines rapidly at temperatures below about 140° C. Therefore, it is preferred to carry out the polymerization reaction at a temperature in the range of from about 145° C. to about 175° C.

The pressure in the polymerization zone varies from a pressure required to maintain a liquid phase flowing over the catalyst up to any desired super-atmospheric pressure. The presence of a liquid phase tends to suppress the formation of cyclic compounds. Pressures from about 500 to about 1000 pounds per square inch gauge generally are suitable, preferably from about 600 to about 800 pounds per square inch gauge.

While conversion generally increases as space velocity decreases, space velocity does not substantially affect the amount of cyclization. Olefin space velocities, weight olefin/hour/weight catalyst (WHSV), of from about 0.1 to about 3 generally are suitable, preferably from about 0.1 to about 2.

Thus, as discussed above, the operating conditions are controlled as to minimize the formation of cyclic compounds having low Luminometer numbers. The polymerization reaction is also controlled to produce the maximum amount of the amylene trimer. As discussed previously, the supersonic jet fuel must not only have a high Luminometer number, but must also meet other specifications such as volatility and viscosity. The amylene dimer is not a good fuel component by itself because it is too volatile at high altitudes. And the tetramer by itself is too viscous at the low temperatures found at high altitudes. However, the trimer not only has a good Luminometer number when hydrogenated but also possesses satisfactory volatility and viscosity characteristics at flight temperatures. As the basic polymerization reaction is to make the dimer, a particularly attractive way of increasing the conversion of amylene to trimer is by injecting a portion of the monomer-containing hydrocarbon feed e.g., about 1/3 of the fresh feed, at a plurality of points along the polymerization reactor tube downstream from the hydrocarbon inlet. The amount of monomer injected can be controlled by analysis of product. If a substantial amount of the dimer is being formed, the amount of monomer injected is increased; if a substantial amount of the tetramer is being formed, the amount of monomer injected is decreased. Fractions containing the dimer can also be recycled to the polymerization zone to increase trimer conversion.

The polymerization zone effluent is fractionally distilled to produce a hydrocarbon fraction rich in amylene trimer (minor amounts of the dimer and tetramer can be tolerated consistent with volatility and viscosity requirements). This fraction can be caustic and water washed to remove trace quantities of acid prior to hydrogenation. As olefins have significantly poorer Luminometer numbers than the corresponding isoparaffins, it is necessary to hydrogenate the amylene trimer to the isoparaffin in order to produce a satisfactory supersonic jet fuel component.

The hydrogenation of the amylene trimer can be effected in the presence of any suitable catalyst. The hydrogenation catalyst can be, for example, a transition metal or metals, particularly those in Group VIB (CR, Mo and W) and in Group VIII (Fe, Ru, Os, Co, Rh, Ir, Ni, Pd and Pt) of the Periodic Table. The catalyst can be used above as an individual metal or as a compound thereof, or as a mixture of metals and/or compounds. The catalyst can also be supported on a non-acidic, inert support such as silica, alumina, charcoal, etc.

The hydrogenation conditions are generally those well-known in the art such as temperature in the range of from about 100° C. to about 300° C., and pressure in the range of from about 50 to about 2000 pounds per square inch gauge. It is desirable to adjust operating conditions to minimize polymerization, depolymerization and cyclization. Higher pressures are favored to keep coke deposition down.

The hydrogenated trimer fraction can be acid and water washed to remove trace impurities such as any unreacted olefins which are gum formers.

The following example is illustrative of some of the advantages derived from the invention, but is not to be considered to limit the scope of the invention.

*Example I*

Two hydrocarbon mixtures containing olefins having 5 carbon atoms were passed through a polymerization zone containing a solid catalyst consisting of pelleted kieselguhr (3/16-inch cylindrical pellets) impregnated with phosphoric acid (total phosphoric acid was about 61% w.; free $P_2O_5$ was from about 15 to about 18% w.). A fraction rich in amylene trimer was separated from polymerization effluent and hydrogenated over a platinum on charcoal catalyst. Process conditions and various properties of the hydrogenated product are shown in Table II.

TABLE II.—PRODUCTION OF SUPERSONIC JET FUEL COMPONENT

|  | Sample I | Sample N |
|---|---|---|
| Feed Composition, percent w.: |  |  |
| 2-methyl-2-butene | 50 |  |
| 2-pentene |  | 50 |
| n-Pentane | 50 | 50 |
| Polymerization Conditions: |  |  |
| Temperature, ° C | 150 | 210 |
| Pressure, p.s.i.g | 690 | 695 |
| Olefin space velocity (WHSV) | 0.79 | 0.27 |
| Hydrogenation Conditions: |  |  |
| Temperature, ° C | 150 | 150 |
| Pressure, p.s.i.g | 2,000 | 2,000 |
| Product Properties: |  |  |
| Gravity, ° API | 48.7 | 45.9 |
| Freeze Point, ° F | <−100 | <−100 |
| Pour Point, ° F | <−85 | <−85 |
| Luminometer number | 87 | 75 |
| Viscosity, cs. at −30° F | 12.2 | 15.4 |
| Refractive Index, $n_D^{20}$ | 1.4362 | 1.4402 |

The polymerization and hydrogenation of the hydrocarbon mixture containing iso-olefin (2-methyl-2-butene) resulted in a better supersonic jet fuel component than the polymerization and hydrogenation of the hydrocarbon mixture containing normal olefin (2-pentene). The superiority of the iso-olefin product is shown by a higher Luminometer number and is attributable in part to (1) the fact that less cyclic compounds are produced when polymerizing a feed containing iso-olefin (as evidenced by a lower refractive index) than when polymerizing a feed containing only normal olefin and (2) the lower polymerization reactor temperature results in less cyclization than the higher polymerization temperature. Additional improvement in Luminometer number is realized by the extraction of cyclic aromatic compounds from the fraction rich in amylene trimer prior to hydrogenation of this fraction.

We claim as our invention:

1. A process for producing a supersonic jet fuel component from a hydrocarbon feed mixture containing olefins having 5 carbon atoms which comprises.
    (1) passing a major portion of the feed in the liquid phase into a polymerization zone containing a phosphoric acid catalyst at a temperature from 145 to about 210° C., a pressure from about 500 to 1,000 p.s.i.g., and an olefin weight hourly space velocity of about 0.1 to about 3,
    (2) subsequently adding a portion of feed to the partially reacted feed in the polymerization zone, thereby increasing the amount of trimer formation and minimizing the formation of cyclic compounds,
    (3) recovering a fraction rich in amylene trimer,
    (4) hydrogenating the fraction rich in amylene trimer over a hydrogenation catalyst at hydrogenation conditions, and
    (5) recovering a hydrogenated product substantially free of olefin for use as a jet fuel component.

2. The process of claim 1 wherein the polymerization temperature is from 145° to 175° C., and the feed contains at least 5% w., basis total olefin content, of iso-olefin.

3. A process for producing a supersonic jet fuel component from a hydrocarbon feed mixture containing olefins having 5 carbon atoms which comprises
    (1) passing olefin feed in the liquid phase through an inlet into a polymerization zone containing a supported phosphoric acid catalyst at a temperature from 145° to about 210° C., a pressure of about 500 to 1,000 p.s.i.g., and an olefin weight hourly space velocity of about 0.1 to about 3,
    (2) injecting additional feed mixture into the polymerization zone at at least one point downstream from the inlet, thereby producing substantial amounts of trimer and reducing formation of cyclic compounds,
    (3) recovering a fraction rich in amylene trimer,
    (4) hydrogenating the fraction rich in amylene trimer over a hydrogenation catalyst at hydrogenation conditions, and
    (5) recovering a hydrogenated product substantially free of olefin for use as a jet fuel component.

4. The process of claim 3 wherein the polymerization temperature is from 145° to 175° C., and the feed contains at least 5% w., basis total olefin content, of iso-olefin.

References Cited by the Examiner

UNITED STATES PATENTS

| | | | |
|---|---|---|---|
| 2,892,002 | 6/1959 | Summers | 260—683.15 |
| 3,125,503 | 3/1964 | Kerr et al. | 260—683.15 |
| 3,130,244 | 4/1964 | Nixon | 260—683.15 |
| 3,146,186 | 8/1964 | Leas et al. | 260—683.15 |

FOREIGN PATENTS 544,244   7/1957   Canada.

PAUL M. COUGHLAN, *Primary Examiner.*

R. H. SHUBERT, *Assistant Examiner.*